United States Patent
Gajapaka et al.

(10) Patent No.: US 12,481,453 B2
(45) Date of Patent: Nov. 25, 2025

(54) UNMAPPING A WRITE BUFFER PORTION FOR ACCESS DURING A WRITE TO A MEMORY DEVICE

(71) Applicant: QUALCOMM Incorporated, San Diego, CA (US)

(72) Inventors: Sai Naresh Gajapaka, Hyderabad (IN); Chintalapati Bharath Sai Varma, Hyderabad (IN); Santhosh Reddy Akavaram, Hyderabad (IN); Prakhar Srivastava, Lucknow (IN); Vamsi Krishna Sambangi, Vizianagaram (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/364,277

(22) Filed: Aug. 2, 2023

(65) Prior Publication Data

US 2025/0044982 A1 Feb. 6, 2025

(51) Int. Cl.
*G06F 3/06* (2006.01)

(52) U.S. Cl.
CPC .......... *G06F 3/0656* (2013.01); *G06F 3/0608* (2013.01); *G06F 3/0659* (2013.01); *G06F 3/0679* (2013.01)

(58) Field of Classification Search
CPC .... G06F 3/0656; G06F 3/0608; G06F 3/0659; G06F 3/0679
See application file for complete search history.

(56) References Cited

U.S. PATENT DOCUMENTS

| | | | |
|---|---|---|---|
| 5,745,672 A * | 4/1998 | Stiffler | G06F 11/1407 |
| | | | 714/6.12 |
| 2009/0225094 A1 | 9/2009 | Fouladi et al. | |
| 2010/0011187 A1 | 1/2010 | Schoinas et al. | |
| 2012/0210041 A1* | 8/2012 | Flynn | H05K 7/1444 |
| | | | 711/3 |
| 2017/0083263 A1* | 3/2017 | Mirichigni | G06F 3/0659 |
| 2019/0042140 A1* | 2/2019 | Natarajan | G06F 3/068 |
| 2019/0258568 A1* | 8/2019 | Park | G06F 3/0659 |

OTHER PUBLICATIONS

International Search Report and Written Opinion—PCT/US2024/032429—ISA/EPO—Aug. 13, 2024.

\* cited by examiner

*Primary Examiner* — Hosain T Alam
*Assistant Examiner* — Subir Kumar Chowdhury
(74) *Attorney, Agent, or Firm* — Loza & Loza, LLP

(57) ABSTRACT

Aspects relate to interrupting memory access during background operations of a memory device. In one example a memory device includes a memory controller to initiate a write buffer flush operation. A bus interface is coupled to a main memory and to a write buffer to receive a write command from a host during the write buffer flush operation. The memory controller initiates the write buffer flush operation, suspends the write buffer flush operation in response to the write command, sends a last flushed address of the write buffer from the memory device to the host through the bus interface, and unmaps a portion of the write buffer using the last flushed address.

24 Claims, 12 Drawing Sheets

UNMAPPING A WRITE BUFFER PORTION FOR ACCESS DURING A WRITE TO A MEMORY DEVICE

TECHNICAL FIELD

Aspects of the present disclosure relate generally to write access to a main memory of a memory device through a write buffer and, in particular, to umapping a flushed portion of the write buffer for access during a later write to the main memory.

BACKGROUND

Modern computing systems use significant memory resources. A memory may have many individual memory cells managed by a memory controller. Each cell is able to simultaneously store 1, 2, 3, 5, or another number of bits, depending on the physical structure of the cell. A memory controller manages read operations of data from the memory cells and write operations of external data into the cells. The memory controller also manages the use of the memory cells and may control logical address maps. Logical address maps are used to map logical data addresses to physical data addresses of particular cells.

Memory devices with a large main storage may use a buffer to allow write operations to be serviced more quickly. A host will write data quickly to a buffer and then the memory device will later write that data to the large main storage as a background operation. A write command queue is emptied into the write buffer more quickly than it would be into the main storage. The write buffer may be faster than the main storage because it is smaller but may also be implemented using a faster technology.

In some memory devices, the large main storage is fabricated using flash memory with a triple-level cell (TLC), quad-level cell (QLC), or a multi-level cell (MLC). The multiple level cells allow multiple bits to be stored in one cell for higher storage density and lower cost. The write performance of TLC and MLC flash is considerably lower than single-level cell (SLC) flash memory because the logically defined TLC bits require more programming steps and have higher error correction probability. TLC and MLC flash memory also tend to endure fewer write cycles than SLC flash memory.

To improve the write performance of multiple level flash memory of a main storage, e.g., TLC, a write buffer is constructed of faster, more durable, but more expensive SLC flash cells. Memory hosts write to the SLC buffer at a higher speed. The memory device then flushes the SLC content to the TLC flash as a background process. For read operations, direct access to the large main storage is often quicker than providing a buffer because of the complexity in fetching data in advance as a background process.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example, a flushed portion of the write buffer is unmapped for access during a later write to the main memory. An apparatus includes a main memory, a write buffer coupled to the main memory and to a bus interface, and a memory controller configured to initiate a write buffer flush operation. The bus interface is coupled to the main memory and to the write buffer to receive a write command from a host during the write buffer flush operation. The memory controller is configured to initiate the write buffer flush operation and to suspend the write buffer flush operation in response to the write command. The memory controller sends a last flushed address of the write buffer from the memory device to the host through the bus interface and unmaps a portion of the write buffer using the last flushed address.

In one example, a method includes initiating a write buffer flush operation, receiving a write command at a memory device from a host during the write buffer flush operation at the memory device, the memory device having a write buffer coupled to a main memory, and suspending the write buffer flush operation in response to the write command. The method includes sending a last flushed address of the write buffer from the memory device to the host, and unmapping a portion of the write buffer using the last flushed address. A further write command from the host, and the further write command is buffered using the portion of the write buffer.

In another example a non-transitory computer-readable medium has instructions stored therein for causing a processor of an interconnect link to perform the operations of the method above.

In another example an apparatus includes a command queue configured to store commands to be sent to a memory device, the memory device having a write buffer coupled to a main memory. The apparatus also includes a write buffer map, a bus interface coupled to the memory device, configured to send a write command to the memory device from the host during a write buffer flush operation at the memory device and to receive a last flushed address of the write buffer from the memory device, and a host controller configured to determine a flushed portion of the write buffer based on the last flushed address. The bus interface is configured to send an unmap command to the memory device, to unmap the portion of the write buffer and to send a further write command.

In another example a method includes sending a write command to a memory device from a host during a write buffer flush operation at the memory device, the memory device having a write buffer coupled to a main memory. A last flushed address of the write buffer is received from the memory device. A flushed portion of the write buffer is determined based on the last flushed address. An unmap command is sent to the memory device, to unmap the portion of the write buffer and a further write command is sent.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
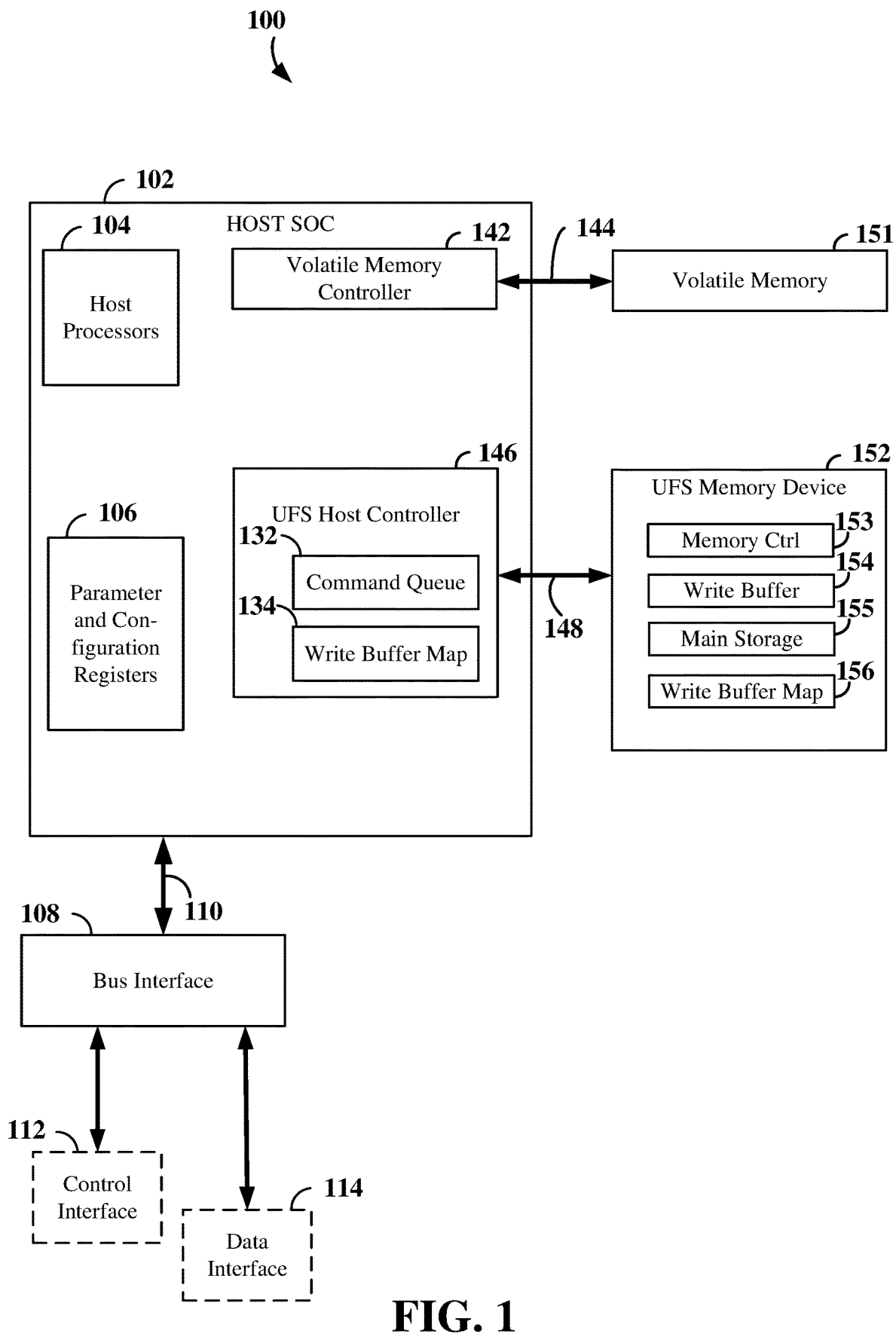
FIG. 1 is a diagram of an example computing system that includes a system-on-a chip (SOC) coupled to a memory device through a UFS bus suitable for aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

When a host receives a memory access command from an application layer, e.g., to write data to a memory device, the host sends commands and data through a memory bus to the memory device. When the memory device performs the write commands through a write buffer, the write commands are serviced more quickly than performing the write directly to the main storage. However, the data in the write buffer must be flushed to the main storage in order to free blocks of memory cells in the write buffer for re-use. The flush operation is performed in the background but may be suspended due to a new write command. Since the application layers generate write commands independent of a flush operation at the memory device, the write buffer may not be fully flushed when new write commands are received.

As described herein, a flushed portion of the write buffer is unmapped for access during a later write to the main memory. When a write command is received from a host during a write buffer flush operation, the memory device suspends the write buffer flush operation and sends a last flushed address of the write buffer to the host. This allows the host to send an unmap command for a portion of the write buffer using the last flushed address. The unmap command may be sent before the write buffer flush operation is completed. After the flushed portion of the write buffer is unmapped, it can be used again as a write buffer for new write commands from the host. The memory device has write access to the newly unmapped portion of the write buffer for later write commands that will be sent to the main memory. With a portion of the write buffer available, the quick performance of the write buffer may be maintained. The memory device can resume the write buffer flush operation after servicing the outstanding write commands.

The present description is presented in the context of the JEDEC Standard Universal Flash Storage 4.0 (referred to as UFS herein), however, the principles herein may be applied to other memory device standards, operations, and data bus configurations. UFS describes protocols and communication formats for a memory bus that connects a host and a memory device with one device per UFS port. The specification is optimized for external flash memory devices, but targeted memory devices include external memory cards and embedded devices, including bootable mass storage. Extensions to input/output devices, cameras, wireless devices, and other device types are envisioned.

An unmap command has been used for a variety of different memory systems. In UFS, the transport protocol supports packets and frames and many of the commands are based on Small Computer System Interface (SCSI) which includes an unmap command. The unmap command is used to erase and to discard data in memory cells. Unmapping is an operation that moves data from a mapped address space in a memory map to an unmapped address space in the memory map. The unmap command as used herein deallocates the unmapped memory cells from their use in the write buffer and returns the unmapped memory cells to a pool of available physical memory resources. Any data in the unmapped memory cells is not valid and is ignored. The unmap command is applied to the write buffer map after the data in the corresponding memory cells have been copied to the main memory.

FIG. 1 is a diagram of an example computing system 100 that includes a system-on-a chip (SOC) coupled to a memory device through a UFS bus. The host SOC 102 includes one or more host processors 104 for performing the primary operations of the die and parameter and configuration registers 106. The host processors execute application layers and represent higher layers with respect to memory and memory operations. The host SOC 102 may be configured for use as any desired computing device from an embedded processor to a portable communications device to a desktop workstation to a server. The host processors 104 access a memory device 152, e.g., a UFS memory device, through a memory bus 148, e.g., a UFS bus, using a host controller 146, e.g., a UFS host controller.

In accordance with various aspects of the disclosure, an element, or any portion of an element, or any combination of elements may be implemented with the host processors 104. Examples of the processors include a central processor, a graphics processor, a special purpose processor, a memory controller, and an input/output controller. Examples of a host controller 146 include microprocessors, microcontrollers, digital signal processors (DSPs), field programmable gate arrays (FPGAs), programmable logic devices (PLDs), state machines, gated logic, discrete hardware circuits, and other suitable hardware configured to control the memory bus connection to the memory device. In various examples, the host SOC 102 may be configured to perform any one or more of the functions described herein. The host SOC 102 contains other components (not shown) configured to perform other functions of the module as is suitable for the type of die.

The host SOC 102 may be implemented with a bus architecture that may include any number of interconnecting buses and bridges depending on the specific application of the host SOC 102. A bus architecture may be used to communicatively couple together various circuits including processors, controllers, timing sources, peripherals, data buffers, modules, power management circuits, and other processing cores, which are not described any further. A bus interface 108 provides an interface between an external bus 110 and other optional external interfaces e.g., a control interface 112 and a data interface 114, etc. The processors 104 may communicate operations, administration, or management control with the control interface.

The control interface 112 may be used to provide a communication interface or means of communicating with various other apparatuses and devices (for example, other devices housed within the same package or system) over an internal bus or external transmission medium, such as command and control interfaces for power regulation, power-on test, and other purposes. The data interface 114 may be used to provide data connections to other types of components within the package or system. The control interface 112 and the data interface 114 may be connected to a higher layer and to lower-level peripherals, sensors, and other components. There may be multiple different control interfaces and data interfaces coupled to the same bus 110 or an additional bus.

The host processors 104 are coupled to a volatile memory controller 142 to interface with a volatile memory 151 such as a random-access memory (RAM) through a RAM bus 144. The host processors 104 are coupled to a host controller 146 to interface with a memory device 152, e.g., a UFS memory device, through a memory bus 148. There may be more memory devices and each device may couple through a host controller or a shared host controller. The host controller 146 receives commands from the host processors 104, buffers the commands in a command queue 132 of the host controller 146 and then, when ready, sends the commands to the memory device 152, using a write buffer map 134, when appropriate, through the memory bus 148.

The memory device 152, e.g., a UFS memory device, includes a memory controller 153, a write buffer 154, main storage 155, containing the primary memory cells for storing data, and a write buffer map 156. The memory controller 153 maps logical memory addresses to physical memory addresses of the memory cells of the main storage 155. The map may be stored in the write buffer map 156 or another location (not shown). The memory controller 153 manages the operation of the write buffer 154 which provides fast temporary storage of data from the UFS host controller 146. This data is then written from the write buffer 154 to the main storage 155 using the write buffer map 156. The memory controller 153 performs background operations to maintain and optimize the operation of the write buffer 154, the main storage 155, and the write buffer map 156, as well as any other components of the memory device 152.

A variety of different commands may be received from the host processors 104. Common memory access commands are to write to one or more registers of the main storage 155 of the memory device 152 and to read from one or more registers of the main storage 155 of the memory device 152. There are also commands to perform background operations. For example, in a flash memory, whether in the main storage 155, the write buffer 154 or any other flash memory component, an erase command may be treated as a purge and an unmap command. For the write buffer 154, a block containing the memory cells from the write buffer 154 are flashed and then the memory cells of the block are unmapped from the write buffer map 134, 156, i.e., the write buffer map does not show any data as being mapped to those cells of the write buffer 154 that were flashed. The write buffer map 134, 156 maps addresses of registers of the write buffer to logical addresses in the main memory to which the write buffer data is to be written. During a background operation, the data in the write buffer 154 is written to the register at the corresponding logical address of the main storage 155. The corresponding memory cells of the write buffer will be purged or flashed for re-use. Replies from the memory device 152 are returned on the memory bus 148 and sent to the host processors 104 or other component as appropriate for the command.

The memory controller 153 also serves as an interface through the memory bus 148 to the host controller 146. The memory controller 153 may include an interface layer as an interface to the memory bus 148. The interface layer may include a logic layer and a physical layer to the UFS bus. The interface layer may be integrated into the memory controller 153 as shown or configured as a separate component. Similarly, the UFS host controller 146 may also include an interface layer (not shown) with a logic layer and a physical layer to the UFS bus.

A UFS bus has multiple upstream and downstream links that operate on differential signaling. There are also reset and clock lanes to support the differential lanes. The transport protocol supports packets and frames with commands based on Small Computer System Interface (SCSI). However, UFS is provided only as an example, and the aspects presented herein may be applied to variations on UFS and other memory systems. The memory bus 148 may be a UFS bus.

The host controller 146 may have additional buffers, controllers, and other components, including read buffers, write buffers, status registers, physical interface state machines and other components, not shown herein. Similarly, the memory device 152 may also have buffers, controllers, status and control registers, and other components not shown herein.

The memory controller may be configured to operate a variety of different background operations independently of the host (shown as the host controller above). The memory device, using its memory controller, may be configured to signal to the host a need to execute a particular background operation. The signal to the host allows the host to find a suitable time for the background operation. As an example, the host may check the command queue, that it is empty, or continue to process commands to the memory device until the command queue is empty. The host responds to the request by setting a background operation enable flag. This is sent to the memory device which then starts the background process.

A background operation needed request from the memory controller may take different forms that indicate the performance or the operation as being impacted or critical. In one example a first level is 02h: Operations outstanding (performance being impacted), and a second level is 03h: Operations outstanding (critical). An example of a background operation is a write buffer flush operation. The write buffer flush operation may have a unique write buffer flush needed request from the memory device and write buffer flush enable flag set by the host. The write buffer flush operation is an operation that is performed on the write buffer when the write buffer is full or almost full in order to free physical blocks of the write buffer for re-use. The write buffer flush operation copies all the data from at least a portion of the write buffer and then erases that portion of the write buffer. Other background operations include a purge operation to erase unused memory cell blocks in the main storage and dynamic device capacity to reset the capacity of the main storage after a purge or other re-mapping.

In order to keep the write buffer 154 available for new data from the host controller 146, the data in the write buffer 154 must be flushed from the write buffer 154 and written into the main storage 155. In some examples, when the host controller 146 issues a write command to the memory device 152, the memory device, on receiving this command, interrupts any current or pending flush operation in order to receive the new write command. If there is room in the write buffer 154, then the data for the new write command will be stored in the write buffer. If the write buffer is full, then the data is written directly into the main storage 155, bypassing the write buffer 154. Writing directly into the main storage 155 is much slower than writing to the write buffer 154, so performance is improved by increasing the availability of the write buffer.

There are three processes required to flush a flash memory-based write buffer. First data is copied from the write buffer to the main storage. The logical to physical address map is updated to reflect the new location of the data. With a flash-based write buffer, each block of memory cells is then flashed to allow the block to be re-used. Finally, the flashed block of memory cells is unmapped from the write buffer map. When the write buffer map is used to receive new data, the unmapped memory cells will show as being available to receive new data. In some implementations, the entire write buffer is flashed before the memory cells are unmapped. In some implementations, the write buffer is divided into partitions so that each partition serves a different logical address unit of the main memory. A partition may then be flushed independent of other partitions. When a write operation is received during a flush operation and the flush operation stops to allow more data to be written into the write buffer, it may take much more time to finally complete the flush operation. During an active period of use, it may not be possible to complete a flush operation. This may cause the write buffer to be bypassed during the times of heaviest use.

To perform a background operation, e.g., a flush operation, the memory device 152 sends a request to the host 102. The host controller 146 sets a background operation enable flag, but does not start the background operation or run the background operation. The memory device runs the background operation independent of the host. At the same time, the host receives commands from application layers, such as from the host processors independent of whether the memory device is running any background operation. The host may therefore issue commands to the memory device independent of any background operation status.

In UFS, the application layer of UFS includes a UFS command set (UCS), a device manager and a task manager. The UCS will handle the normal commands like read, write, etc. UFS may support multiple command sets. UFS is designed to be protocol agnostic. The command set is based on a simplified SCSI command set. The UCS also has a UFS native command set that may be used to extend some UFS functionalities. The task manager, run by the UFS host controller handles commands meant for command queue control. The device manager run by the memory controller provides device level control like query request and lower-level link-layer control.

Figure 2:
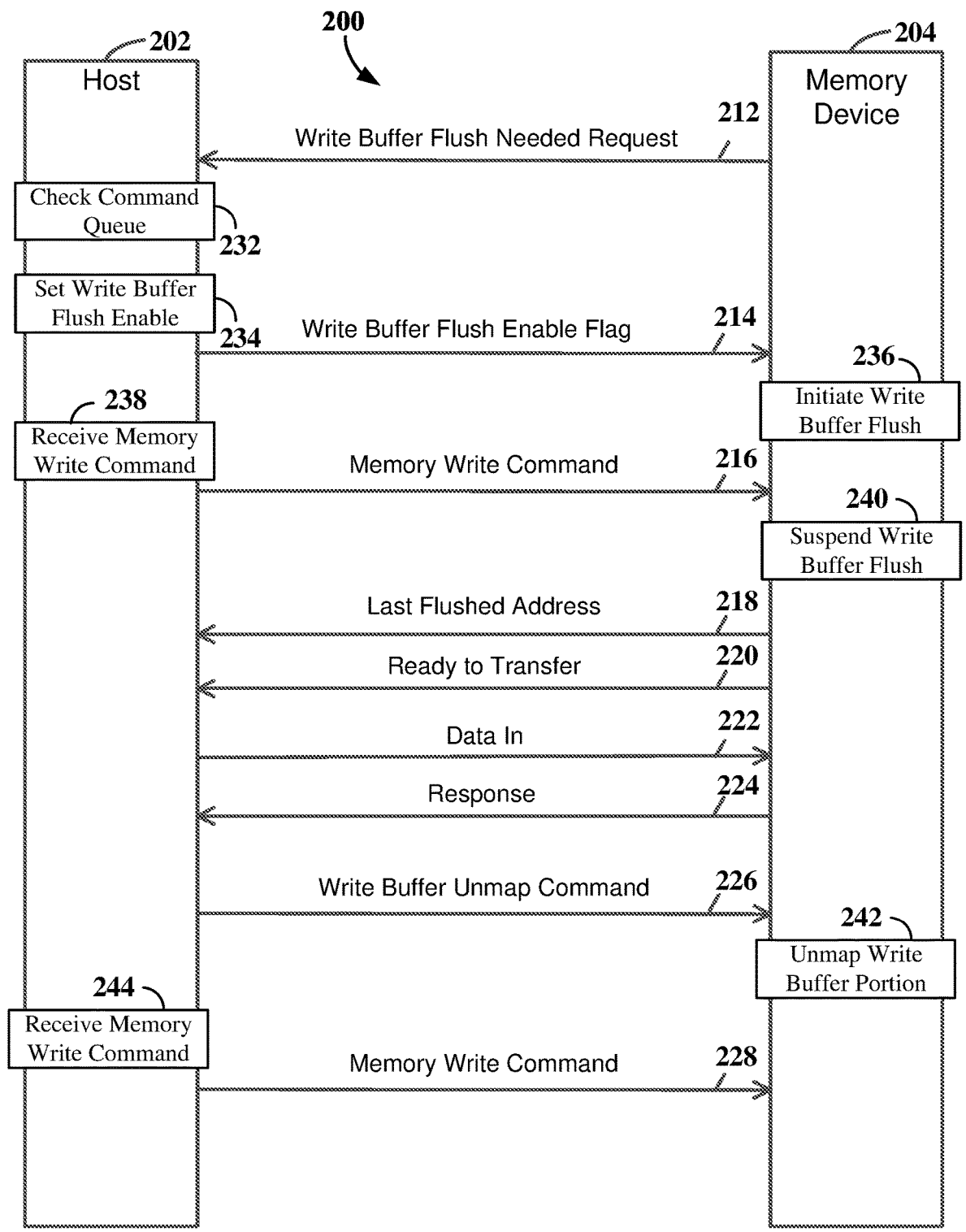
FIG. 2 is a diagram of signals and operations performed by a host and a memory device suitable for aspects of the present disclosure.

FIG. 2 is a diagram of signals and operations performed by a host and a memory device for a purge operation. The host 202 is coupled to the memory device 204 by a bus 200 represented by the signals between the host 202 and the memory device 204. The host 202 and the memory device 204 have performed startup, configuration, handshake, and other operations, not described herein, and are configured for memory access using the bus 200.

In some aspects, after some time of operation, the memory device, through its memory controller, determines that a write buffer flush operation is needed to ensure that the write buffer is available to receive new data. Accordingly, it sends a write buffer flush needed request 212 to the host 202. For UFS, this request may be in the form of a Response UFS Protocol Information Unit (UPIU) that includes an indication of importance, e.g., 02h or 03h. The host receives the request and processes the request to determine whether the request should be allowed. There are different considerations, depending on the nature of the memory device and any bus protocols. In some examples, the host checks the command queue 232. If there are important or urgent commands in the command queue, then the host waits until these commands have been processed by the memory device. After the command queue is empty or the important commands have been processed, and after any other selected considerations, the host sets a write buffer flush enable flag 234. The host may also send a notification, e.g., a buffer flush enable flag 214 to the memory device 204.

For UFS this may be in the form of a Request UPIU. UFS offers an Exception Events Mechanism. One of the defined exception events is flushing the write buffer (referred to as the write booster.) The exception event is started by the memory device when the entire write buffer is full or nearly full. The memory device sends the WRITEBOOSTER_FLUSH_NEEDED from the memory device for the host as a Response UPIU to indicate that the buffer for the WriteBooster needs to be flushed. The host is expected to issue a flush command by setting the enable flag fWriteBoosterBufferFlushEn as "1." This is placed in a Request UPIU. In a Device Information field of the following Response UPIU, the memory device will only indicate the events that were enabled by the host through writing to a wExceptionEventControl attribute in the Request UPIU. The event bits in the wExceptionEventStatus attribute and in the Device Information field of the Response UPIU are cleared by the device when the clear conditions are met. In an example, the host can set a flag to permit a write booster flush during a hibernate state at the memory device. The memory device may then upon seeing the flag and entering into a hibernate state, initiate a write buffer flush operation without an explicit command from the host.

The memory device 204 detects the write buffer flush enable flag 214 and, after suitable preparation, the memory device 204 initiates the write buffer flush operation 236. Ideally, the memory device continues with the write buffer flush operation until the write buffer flush operation is completed, however, at 238 a memory write command is received at the host 202. The host forwards the memory write command to the memory device 204 at 216. The memory device suspends the write buffer flush operation at 236 in response to the memory write command 216. This is to allow new data to be written into the write buffer or into the main storage if the write buffer is full.

The memory device provides a Response UPIU after suspending the write buffer flush operation. In UFS, the Response UPIU indicates the status of the flush operation for the WriteBooster Buffer. 00h in the Response UPIU means "Idle." The memory device is not flushing the WriteBooster Buffer. 01h in the Response UPIU means "flush operation in progress." The WriteBooster Buffer is not yet empty and a flush has been initiated. 02h in the Response UPIU means "flush operation stopped prematurely." The WriteBooster Buffer is not empty and the host stopped the in-progress flush. 03h in the Response UPIU means, "flush operation completed successfully." 04h in the Response UPIU means "flush operation general failure." When the status is that the flush operation is in progress or prematurely stopped, then the device memory may add the last flushed address to the Response UPIU 218.

The memory write operation that was started with the memory write command 216 may then proceed normally. A similar process is used for other memory access commands such as read, erase, or any other suitable type of operation to access the memory. The memory write command is discussed here because it affects the write buffer. The memory device may respond with a ready to transfer (RTT) message 220, e.g., an RTT UPIU, from the memory device 204 to the host 202. The host may then transfer the data 222 to the memory device 204 to be written to the memory cells, e.g., a Data In UPIU. Upon completion of the transfer, the memory device 204 may send a response 224 to the host 202 indicating the end of the memory access command. This process may then be followed by further memory access commands 228. The particular order and structure of a memory access may be modified to suit different implementations and protocols.

Even though, the write buffer flush enable flag 234 is set, new commands may be received by the host from higher layers of the system, such as application layers and the host processors. A memory access command is received at 238 but the host knows that the write buffer flush operation is likely started. However, the host sends the memory write command 216 to the memory device 204 to provide a prompt write response to the higher layer.

When the host receives the last flushed address in the Response UPIU 218 from the memory device, the host is able to determine how much of the write buffer has been flushed. After the memory write command has been processed, the host may then send a write buffer unmap command 226 to the memory device. This command allows the memory device to unmap the memory cells that were flushed making them available for use again. These write buffer memory cells are unmapped even though they are only a portion of the total write buffer and even though the flush operation was not completed. If the write buffer flush enable flag is still set, the memory device may continue to flush the write buffer after servicing the memory write command. In the meantime, the flushed portion of the write buffer has been made available for new write commands.

Considering the messages and operations of FIG. 2, the write buffer unmap command 226, followed by unmapping the write buffer portion 242, frees that write buffer portion for re-use. This allows that portion of the write buffer to be used even before the write buffer flush operation is completed. Without sending the last flushed address and unmapping a portion of the write buffer, the write buffer may be filled before the write buffer flush operation is completed. This will cause the write operations to be performed much more slowly. In one example, the host uses the last flushed address to determine parameters for the write buffer unmap command. In other words, the host sets the memory addresses that are to be unmapped. In another example, the write buffer unmap command is generalized and the memory device determines the memory addresses that are to be unmapped. In a flash memory-based write buffer, the write buffer will be flashed in blocks and unmapped in blocks. The last flushed address may be the last address of a block that has been flushed. In some aspects, the host may know the structure of the memory blocks and determine the last address of the last flushed block.

Figure 3:
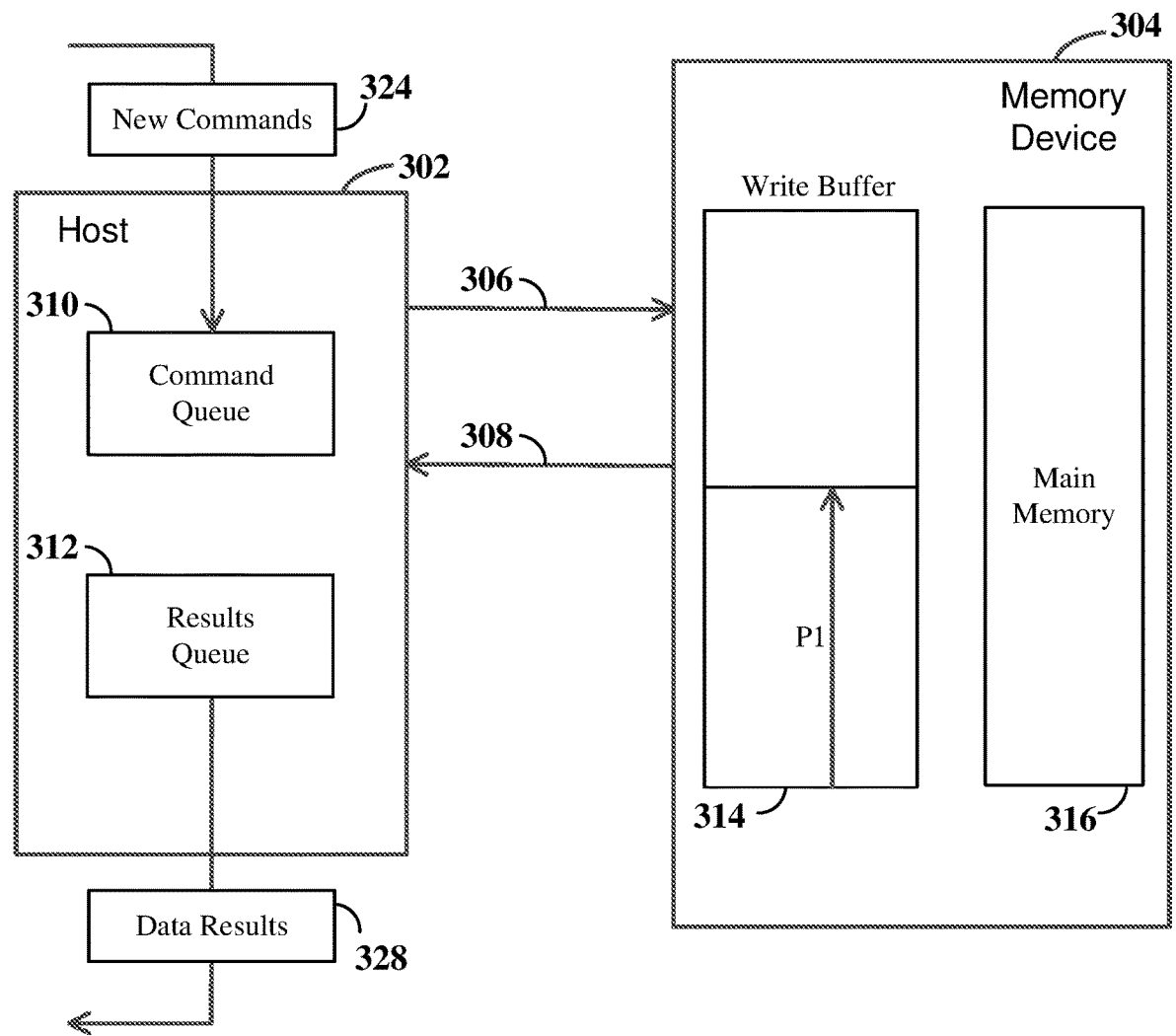
FIG. 3 is a graphical representation of status and communication of a host and a memory device during normal memory access commands according to aspects of the present disclosure.

FIG. 3 is a graphical representation of status and communication of a host 302 and a memory device 304 during normal memory write commands. A host 302 is coupled to a memory device 304 with a downstream link 306 and an upstream link 308. For normal memory access commands, the host receives new memory access commands 324 from upstream or higher layer components, e.g., processors, and stores these commands into a command queue 310. The command queue may be in various levels of capacity, depending on how quickly the commands are received and how quickly they are executed by the memory device. The host sends data and commands as "data in" on the downstream link 306 and receives data and responses as "data out" on the upstream link 308. The results from the upstream link 308 are received in a results queue 312 and reported back as data results 328 to the same higher layers that made the requests.

At the memory device 304, write commands are applied to a write buffer 314 and then later copied to a main memory 316 of the memory device. A memory processor (not shown) manages the copying process, called a flush operation herein, and also maintains various address maps, command queues and configuration and operational parameters for the operation of the memory device. The write buffer 314 may be smaller and faster than the main memory 316 so that write operations into the write buffer 314 are processed much more quickly than they would be if they were into the main memory 316.

In the example of FIG. 3, the write buffer 314 has been filled to a level indicated by arrow P1. The arrow P1 indicates that the memory cells in the area below the arrowhead are full and contain buffered write data. The memory cells in the area above the arrowhead P1 are empty or unmapped. These are available for use.

Figure 4:
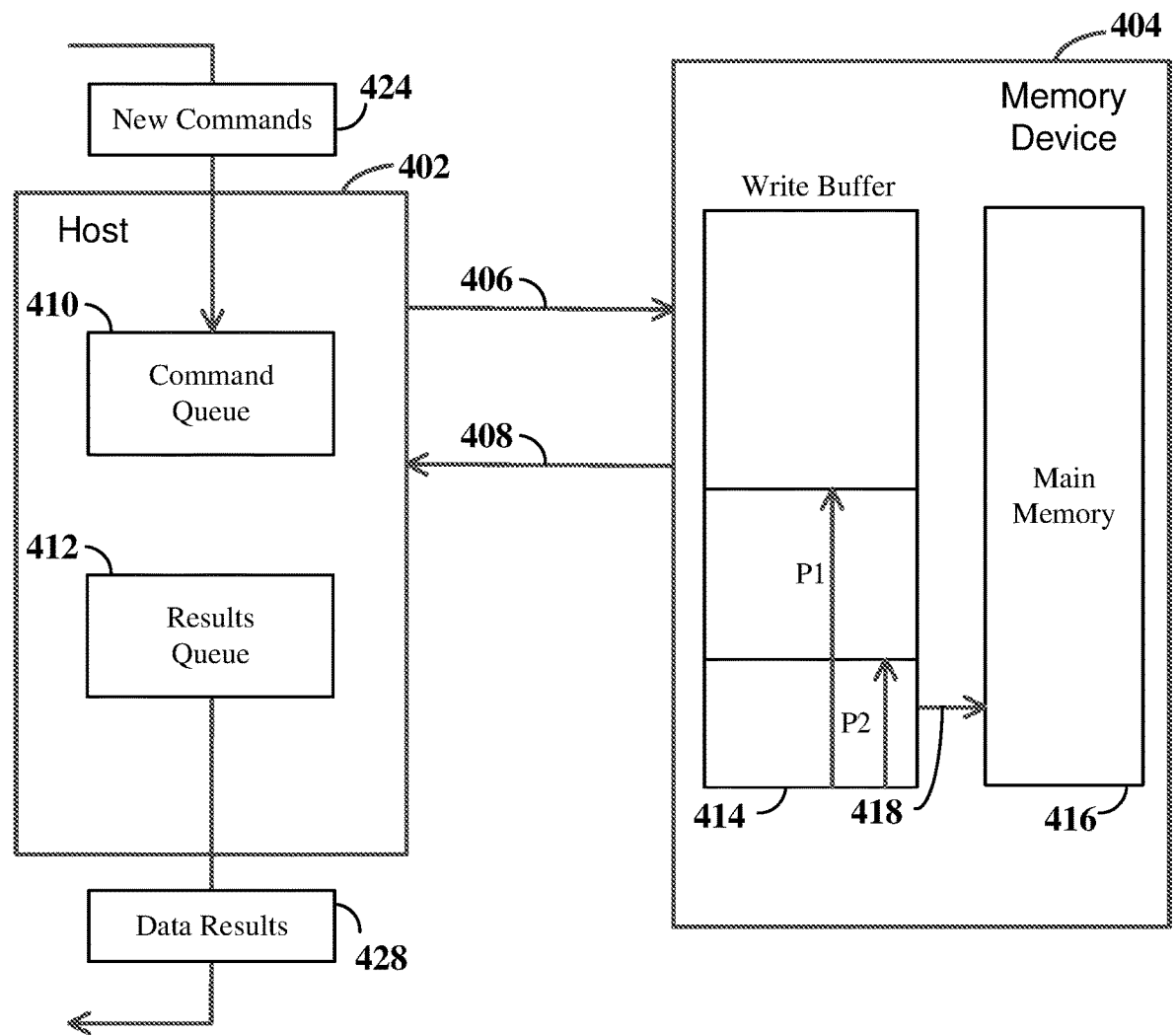
FIG. 4 is a graphical representation of status and communication of a host and a memory device during a write buffer flush operation according to aspects of the present disclosure.

FIG. 4 is a graphical representation of status and communication of a host 402 and a memory device 404 during a write buffer flush operation. The host 402 has received new commands 424 in its command queue 410 and has not yet sent these as memory write commands on the downstream link 406. Responses on the upstream link 408 are received in the results queue 412 and sent as data results 428 to higher layers, e.g., processes on the host processors.

The write buffer flush operation may be initiated in response to a flag set by the host. There is a flag for a write buffer flush enable in response to a request from the memory device and there is a flag for a write buffer flush enable initiated when the memory device is hibernating. No matter how the buffer flush operation is initiated, data is copied from the write buffer 414 of the memory device 404 to the main memory 416 of the memory device 404, as indicated by the arrow 418. A memory map is updated to keep a record of the physical address to which the data has been written in the main memory. After data has been copied from the write buffer 414, it is no longer needed in the write buffer. If the write buffer is a flash memory, then after an entire block of memory cells has been copied, the memory device controller can flash or erase that block of memory cells. This is a slow high-power process that writes a "1" into each cell. Later when a new memory command is received data may be written into the flashed cells. This is referred to as programming the memory cells and is performed by writing a "0" in each cell for which the "1" is not desired.

The write buffer 414 had been filled to the level indicated by the arrow P1. In response to this level, in this example, the memory device 404 sent a write buffer flush needed response to the host 402 on the upstream link 408. The host has allowed the write buffer flush operation or the memory device is in hibernation and has initiated a write buffer flush operation autonomously. The write buffer flush operation is indicated by an arrow 418 from the write buffer 414 to the main memory 416. As shown, the write buffer flush operation has come to a number of memory cell blocks indicated by the arrow P2. In the figure, the bottom of the write buffer indicates the lowest physical address and the top of the arrow P2 is the last flushed address. The top of the arrow P1 is the last full address of the write buffer 414. The three-part box that represents the write buffer 414 is provided to show the principles, not the structure of a memory or the arrangement of physical and logical addresses. In a working system, there may also be wear leveling and TRIM operations so that the affected blocks are not contiguous.

In this example, when a new write command is received, the write buffer flush operation, which is applied to all of the registers up to P1, has progressed only to the level of P2. The memory device, when the flush operation is suspended sends a response to the host that indicates, first, that the write buffer flush operation is incomplete and, second, the last flushed address. The last flushed address corresponds to P2. This may all be in the form of a single Response UPIU to the host or in another form. The host is able to infer all of the flushed memory blocks of the write buffer based on the last flushed address. In some examples, the memory device sends a first flushed address and a last flushed address so that the host is able to determine that all of the blocks between the last flushed address and the first flushed address are flushed.

Figure 5:
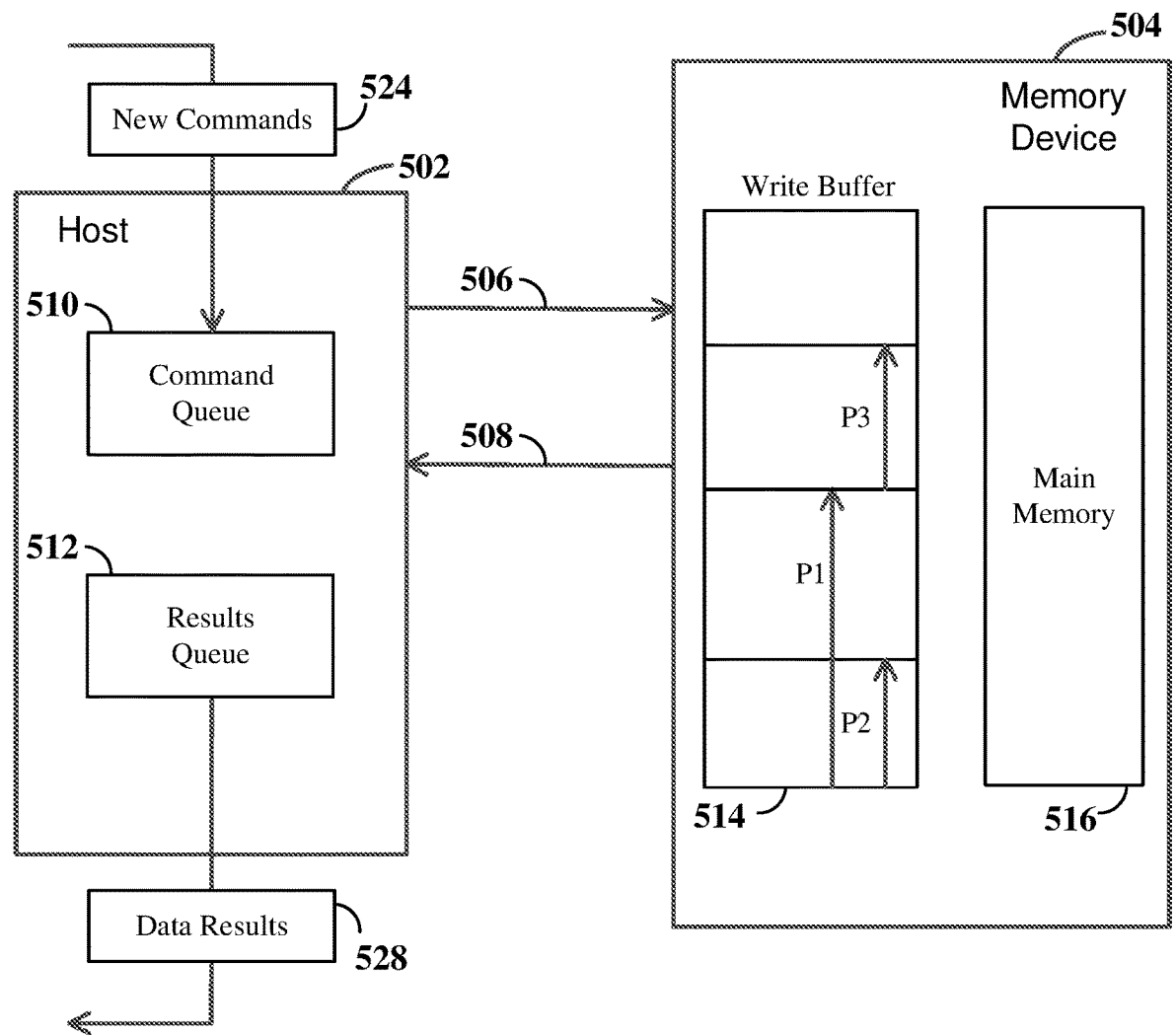
FIG. 5 is a graphical representation of status and communication of a host and memory device during memory write commands after a write buffer flush operation is suspended according to aspects of the present disclosure.

FIG. 5 is a graphical representation of status and communication of a host 502 and memory device 504 after the write buffer flush operation has been suspended. The host continues to receive new commands 524 in the command queue 510 and send these to the memory device 504 through the downstream link 506. Results are received from the memory device 504 through the upstream link 508 into the results queue 512 and then data results 528 are forwarded to higher layers, e.g., applications on the host processors.

In the write buffer 514, the buffer was filled to the arrow P1 level when the write buffer flush operation was initiated. The memory device flushed the write buffer up to the arrow P2 level. However, the write buffer flush operation has not been completed, and new commands 524 are being received. The write buffer up to the arrow P2 level cannot be used because those memory blocks have not been unmapped. They are still mapped to the prior write data that has already been copied into the main memory 516. The new commands are written into the write buffer from the level of the arrow P1 and above, e.g., up to the arrow P3 level. All of this data is kept in the write buffer until a write buffer flush operation is performed.

Figure 6:
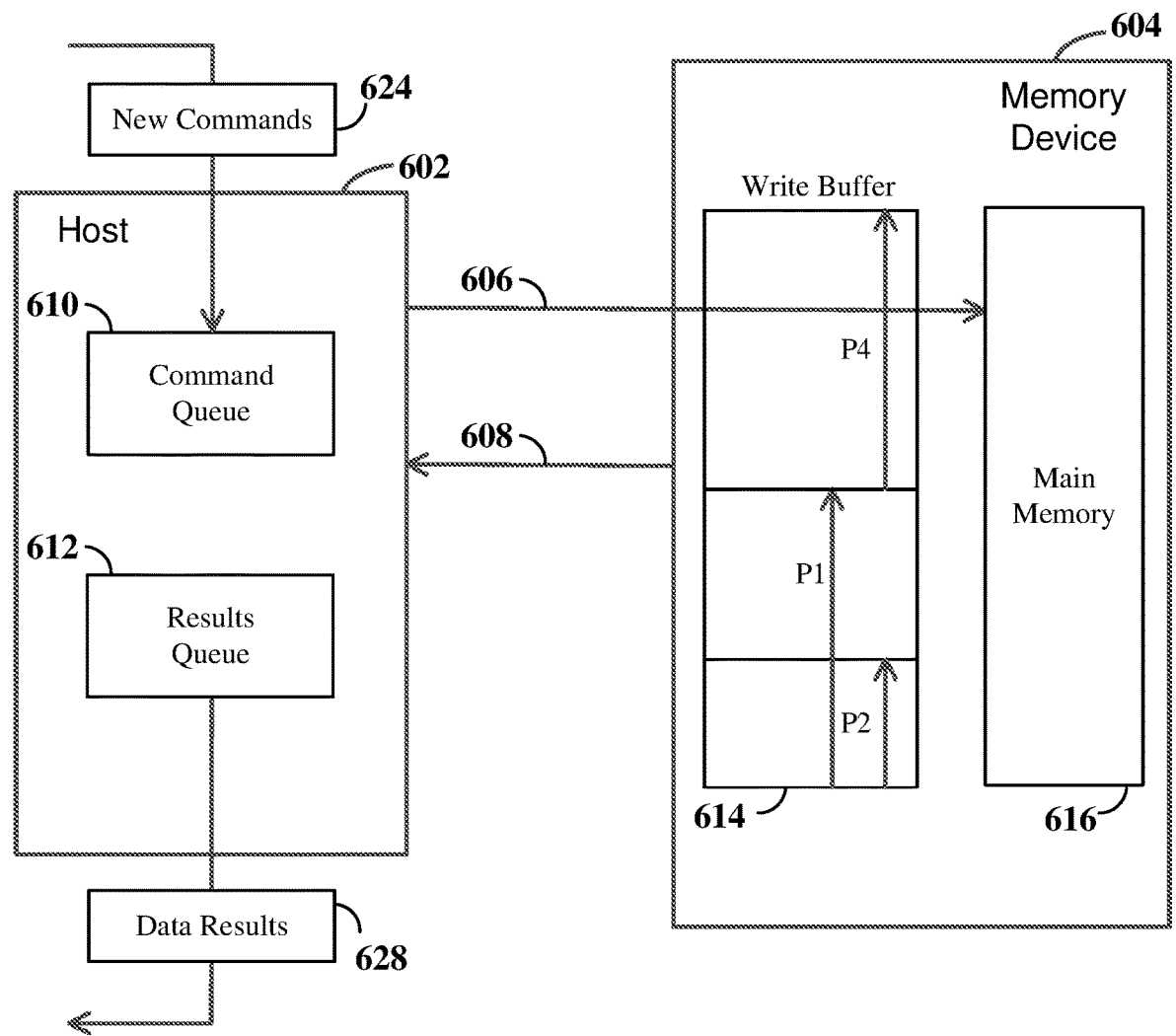
FIG. 6 is a graphical representation of status and communication of a host and memory device during memory write commands after the write buffer is full according to aspects of the present disclosure.

FIG. 6 is a graphical representation of status and communication of a host 602 and memory device 604 after the write buffer 614 has been filled. The new commands 624 continue to be received by the host 602 in the command queue 610 and then sent to the memory device 604 through the downstream link 606. However, the write buffer 614 is filled up to an arrow P4 level which is at or near the last available address of the write buffer 614. As a result, the write buffer 614 can no longer be used and the new data is written directly into the main memory 616 as indicated by the downstream link 606 extending into the main memory 616. In an actual physical system, there may be many intermediate buffers, controllers, timers, address maps, and other components (not shown) between the host 602 and the main memory 616. The write buffer flush operation is still interrupted as new commands 624 are received and data results 628 are output through the upstream link 608 and the results queue 612.

Figure 7:
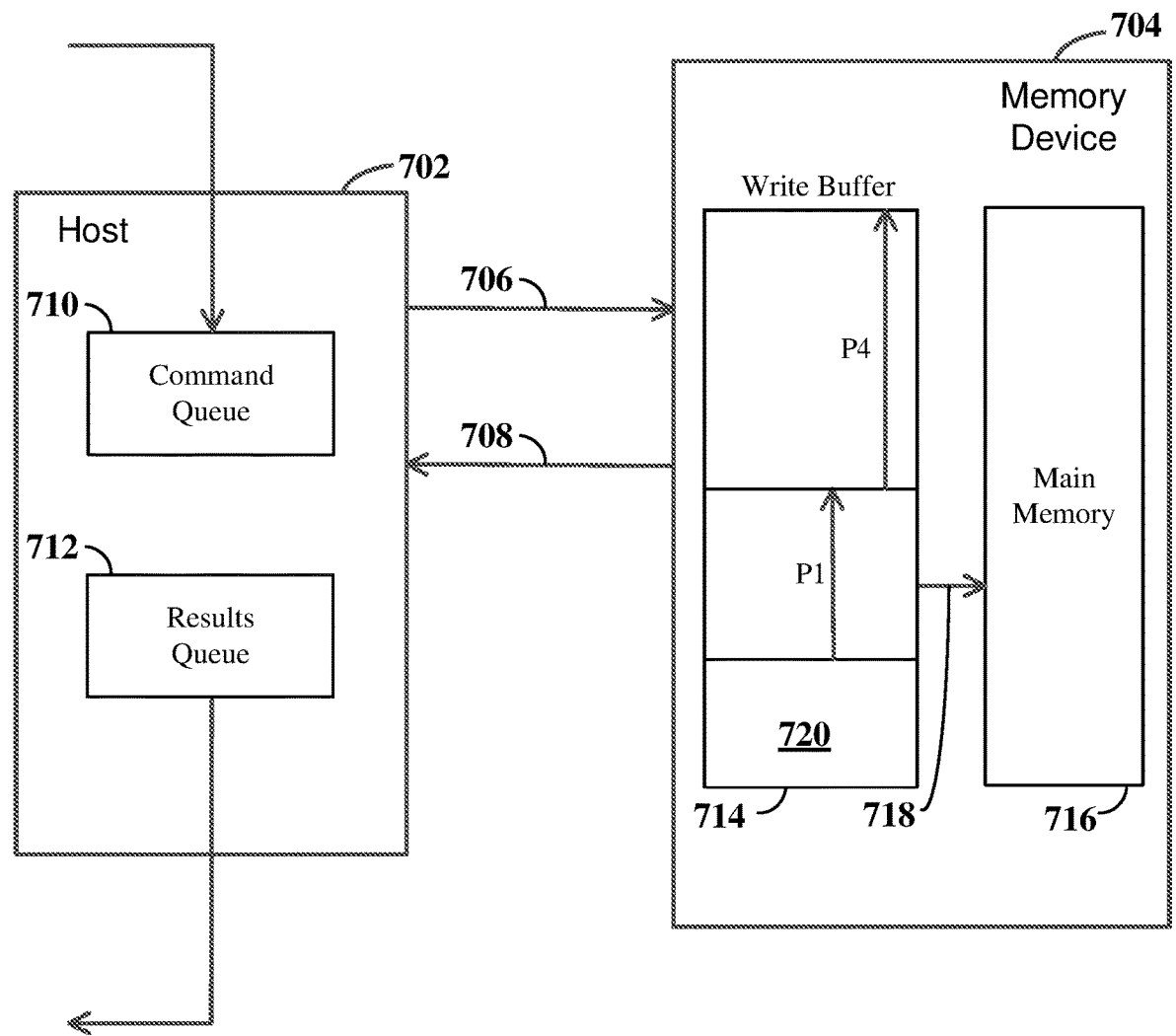
FIG. 7 is a graphical representation of status and communication of a host and memory device after a write buffer flush is resumed according to aspects of the present disclosure.

FIG. 7 is a graphical representation of status and communication of a host 702 and memory device 704 after the write buffer flush operation has been re-initiated. The host does not receive new commands and the command queue 710 is empty. The downstream link 706 and the upstream link 708 are idle and there are no results in the results queue 712. The memory device 704 is full to the level of arrow P4, but the flush operation has been resumed as indicated by the write copy arrow 718 from the write buffer 714 to the main memory 716. Resuming the write buffer flush operation starts with a lowest physical address memory cell in this case the bottom of the arrow P1 and proceeding sequentially through physical addresses of the write buffer to the end, in this case the top of the arrow P1. The bottom of the arrow P1 corresponds to the last flushed address that was earlier sent to the host. The memory device resumes starting at that address and continues until the rest of the portion up to the top of the arrow P1 is completed. This is indicated by the write copy arrow 718 extending from the remaining top portion of P1. In addition, the originally flushed section 720 has been unmapped and is available for use for new memory write commands.

Figure 8:
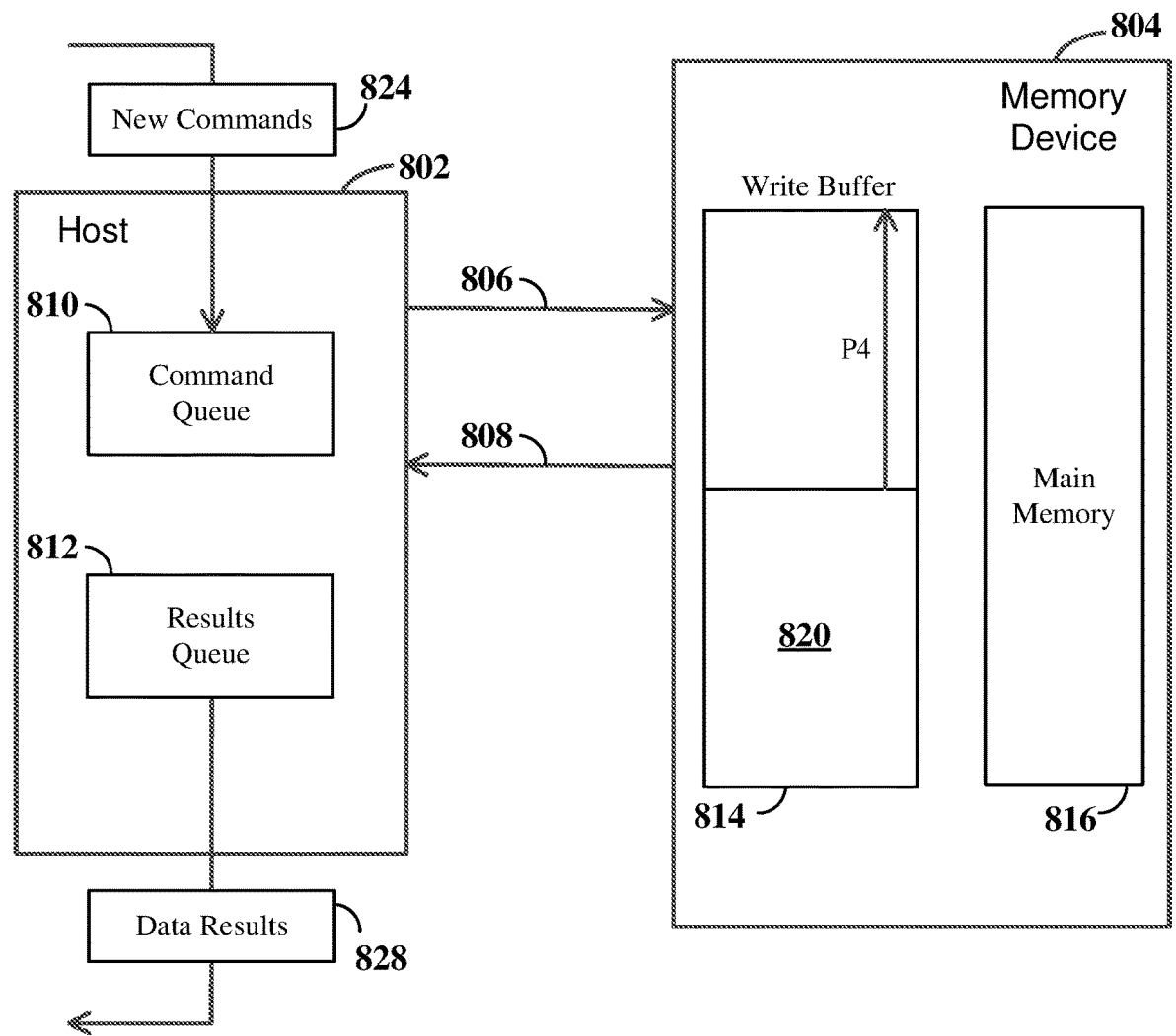
FIG. 8 is a graphical representation of status and communication of a host and memory device during memory write commands after the portion of the write buffer is unmapped according to aspects of the present disclosure.

FIG. 8 is a graphical representation of status and communication of a host 802 and memory device 804 after the write buffer flush operation has been completed. The host continues to receive new commands 824 in the command queue 810 and to send these to the memory device 804 through the downstream link 806. Results are received from the memory device 804 through the upstream link 808 into the results queue 812 and then data results 828 are forwarded to higher layers.

The lower portion 820 of the write buffer 814 has been flushed and unmapped and is available for use by the memory device 804. The upper part of the write buffer up to the top of the arrow P4 is full and waiting to be flushed in a manner similar to that described above with respect to the portion up to the top of arrow P1.

Figure 9:
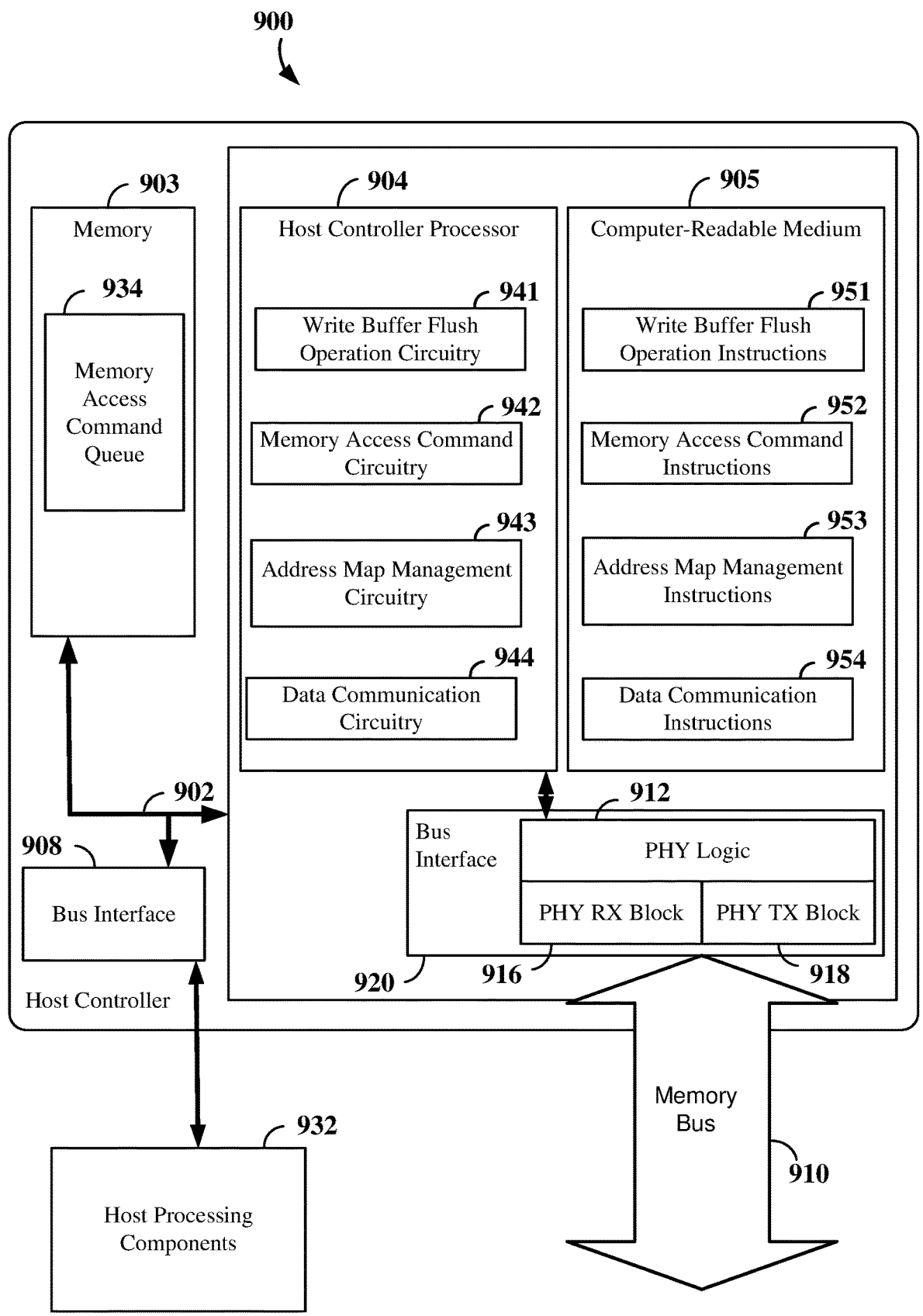
FIG. 9 is a block diagram of a host controller according to aspects of the present disclosure.

FIG. 9 is a block diagram of an example of a hardware implementation for a host controller 900 as the UFS host controller 146 suitable for use with the SOC 102 of FIG. 1 or as a memory host controller for use in any other system. The memory host controller has a memory bus 910 for memory access and background operations. In this example, the host controller has a host controller processor 904 for performing the primary operations of the host controller, a computer-readable medium 905 to provide instructions for the host controller processor 904, and a memory 903 to contain a command queue 934 and other data and instructions. The host controller has a bus interface 920 to support a memory bus 910 to a memory device. The bus interface has a PHY receive block 916 and a PHY transmit block 918 coupled to the memory bus and PHY logic 912. The host controller processor 904 performs the operations described above to service the memory bus 910 between host processing components 932 and a memory device (not shown).

Examples of the host controller 900 include microprocessors, microcontrollers, digital signal processors (DSPs), field programmable gate arrays (FPGAs), programmable logic devices (PLDs), state machines, gated logic, discrete hardware circuits, and other suitable hardware configured to control the memory bus 910 as described throughout this disclosure. In various examples, the host controller 900 may be configured to perform any one or more of the functions described herein. The host controller contains other components (not shown) configured to perform other functions of the host controller as is suitable for the type of memory bus.

In this example, the host controller 900 may be implemented with a bus architecture, represented generally by the bus 902. The bus 902 may include any number of interconnecting buses and bridges depending on the specific application of the host controller 900 and the overall design constraints. The bus 902 communicatively couples together various circuits including memory 903, the host controller processor 904, the computer-readable media (represented generally by the computer-readable medium 905) having instructions stored thereon. The bus 902 may also link various other circuits such as timing sources, peripherals, data buffers, modules, power management circuits, and other processing cores, which are not described any further. A bus interface 908 provides an interface between the bus 902 and host processing components 932, e.g., other external components of a Host SOC, host processing components, application layers, and higher layers. The host controller processor 904 may communicate operations, administration, or management control with the host processing components 932 through the bus 902. The host processing components 932 may send memory access commands to the host controller processor 904 and receive results from the host controller processor.

The PHY transmit block 916 and the PHY receive block 918 are coupled to the memory bus 910 that corresponds to the upstream link and the downstream link described above that couple host processing components 932 to the memory device through pins on respective connectors for the memory bus 910. The module also includes PHY logic 912 which may include the link logic to control the data applied to each line and the state under the control of the host controller processor 904. The PHY logic 912 may also include clock generators coupled to clock sources to generate clock signals and other reference signals for the upstream and downstream links.

The host controller processor 904 is responsible for managing the PHY logic 912 and for interface processing, including the execution of software stored on the computer-readable medium 905. The software, when executed by the host controller processor 904, causes the host controller 900 to perform the various functions described below for any particular apparatus. The computer-readable medium 905 and the memory 903 may also be used for storing data that is manipulated by the host controller processor 904 when executing software.

The host controller processor 904 may perform operations by means of a processor core executing software stored in the computer-readable medium 905. Software shall be construed broadly to mean instructions, instruction sets, code, code segments, program code, programs, subprograms, software dies, applications, software applications, software packages, routines, subroutines, objects, executables, threads of execution, procedures, functions, etc., whether referred to as software, firmware, middleware, microcode, hardware description language, or otherwise. The software may reside on a computer-readable medium 905. The host controller processor 904 controls the operations performed by the PHY logic 912, the command queue 934, and other components of the host controller 900.

The computer-readable medium 905 may be a non-transitory computer-readable medium. A non-transitory computer-readable medium includes, by way of example, a magnetic storage device, a flash memory device, a random access memory (RAM), a read only memory (ROM), a programmable ROM (PROM), an erasable PROM (EPROM), an electrically erasable PROM (EEPROM), a register, and any other suitable medium for storing software and/or instructions that may be accessed and read by a controller. The computer-readable medium 905 may reside with the host controller processor 904 or another part of the host controller 900. The computer-readable medium 905 may be embodied in a firmware for the operation of a state machine or parameters of an ASIC. Those skilled in the art will recognize how best to implement the described functionality presented throughout this disclosure depending on the particular application and the overall design constraints imposed on the overall system.

The host controller 900 may be configured to perform any one or more of the operations described herein. In some aspects of the disclosure, the host controller processor 904, as utilized in the host controller 900, may include circuitry configured for various functions. The host controller processor 904 is coupled to the computer-readable medium 905 through the bus 902. The computer-readable medium 905 includes parameter and configuration registers that may include parameters for response, requests, flags, and operations.

The host controller processor 904 may include write buffer flush operation circuitry 941 to permit a write buffer flush operation by the memory device and to receive a last flushed address from the memory device when interrupting a write buffer flush operation. The write buffer flush operation circuitry 941 may also be configured to send requests and receive responses with a memory device to receive a write buffer flush needed request, including a level of urgency and to set and clear write buffer flush enable flags. The write buffer flush operation circuitry 941 may include one or more hardware components that provide the physical structure that performs various processes related to permitting a write buffer flush operation and receiving a last flushed address to support flush operations. The write buffer flush operation circuitry 941 may include functionality for a means for permitting a write buffer flush operation and a means for receiving a last flushed address from the memory device. The write buffer flush operation circuitry 941 may further be configured to execute write buffer flush operation instructions 951 included on the computer-readable medium 905 to implement the write buffer flush operation support described herein.

The host controller processor 904 may include memory access command circuitry 942 configured to receive a memory access command and to send the memory access command to the memory device in response to receiving the operation completed notification. The memory access command circuitry 942 may include functionality for a means to receive a memory access command and to send the memory access command to the memory device. A memory access command may be received from a higher layer, e.g., host processing components 932. The memory access command circuitry 942 may further be configured to execute memory access command instructions 952 included on the computer-readable medium 905 to implement one or more functions described herein.

The module 914 host controller processor 904 may include address map management circuitry 943 configured to manage a write buffer map and to manage unmapping blocks of the write buffer in response to the last flushed address as discussed herein. The address map management circuitry 943 may include functionality for managing the write buffer map and unmapping blocks of the write buffer. The address map management circuitry 943 may include functionality for a means for managing the write buffer map and for unmapping blocks of the write buffer. The address map management circuitry 943 may further be configured to execute address map management instructions 953 included on the computer-readable medium 905 to implement one or more functions described herein.

The host controller processor 904 may include data communication circuitry 944 configured to communicate commands and data with the memory device through the memory bus 910, as discussed herein. The data communication circuitry 944 may include functionality for a means for communicating data with the memory device. The data communication circuitry 944 may further set parameters for communicating through the memory bus. The data communication circuitry 944 may further be configured to execute data communication instructions 954 included on the computer-readable medium 905 to implement one or more functions described herein.

The circuit architecture described herein may be implemented on one or more ICs, chips, chiplets, modules, interposers, packages, system printed circuit boards (PCBs), etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

Figure 10:
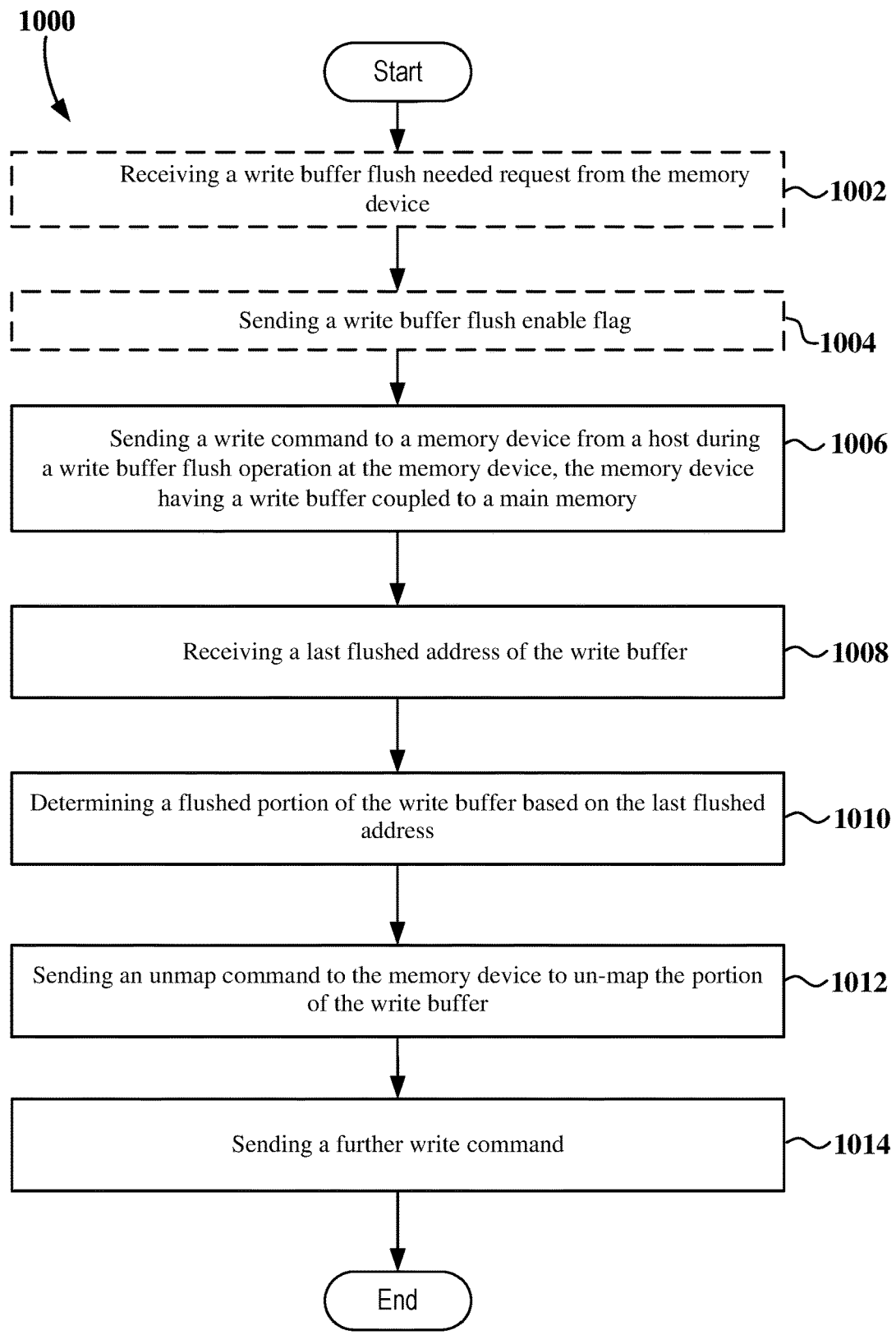
FIG. 10 is a flow diagram of aspects of suspending a write buffer flush operation by a host according to aspects of the present disclosure.

FIG. 10 is a process flow diagram illustrating an example of a method for unmapping a portion of a write buffer for access during a write to the main memory. The method may be performed in the host controller processor 904 of FIG. 9 or other circuitry, and software as described in the context of FIG. 9. The method 1000 optionally begins at block 1002 with receiving, at a host, a write buffer flush needed request from the memory device before the sending the write command. The method 1000 continues in block 1004 with sending a write buffer flush enable flag in response to the write buffer flush needed request or in response to another signal or circumstance. The enable flag may be to permit the write buffer flush when the command queue is empty or to permit the write buffer flush operation when the memory device is hibernating, or at another time.

At block 1006 sending a write command to a memory device from a host during a write buffer flush operation at the memory device is performed. The memory device has a write buffer coupled to a main memory. The write command is a type of memory access command that concerns writing data to the main memory of the memory device coupled to the host. Other commands may also be sent to the memory device. Block 1008 pertains to receiving a last flushed address of the write buffer.

At block 1010, determining a flushed portion of the write buffer based on the last flushed address is performed. The flushed portion may be identified as an address range, particular blocks, or in another way. Block 1012 pertains to sending an unmap command to the memory device to unmap the portion of the write buffer. This command allows the memory device to unmap the flushed portion of the write buffer so that it is available for use with new write commands. At block 1014, sending a further write command is performed. The further write command may cause new data to be stored in the unmapped portion of the write buffer. Although, based on other memory management concerns, the new data may be stored in another part of the write buffer.

Figure 11:
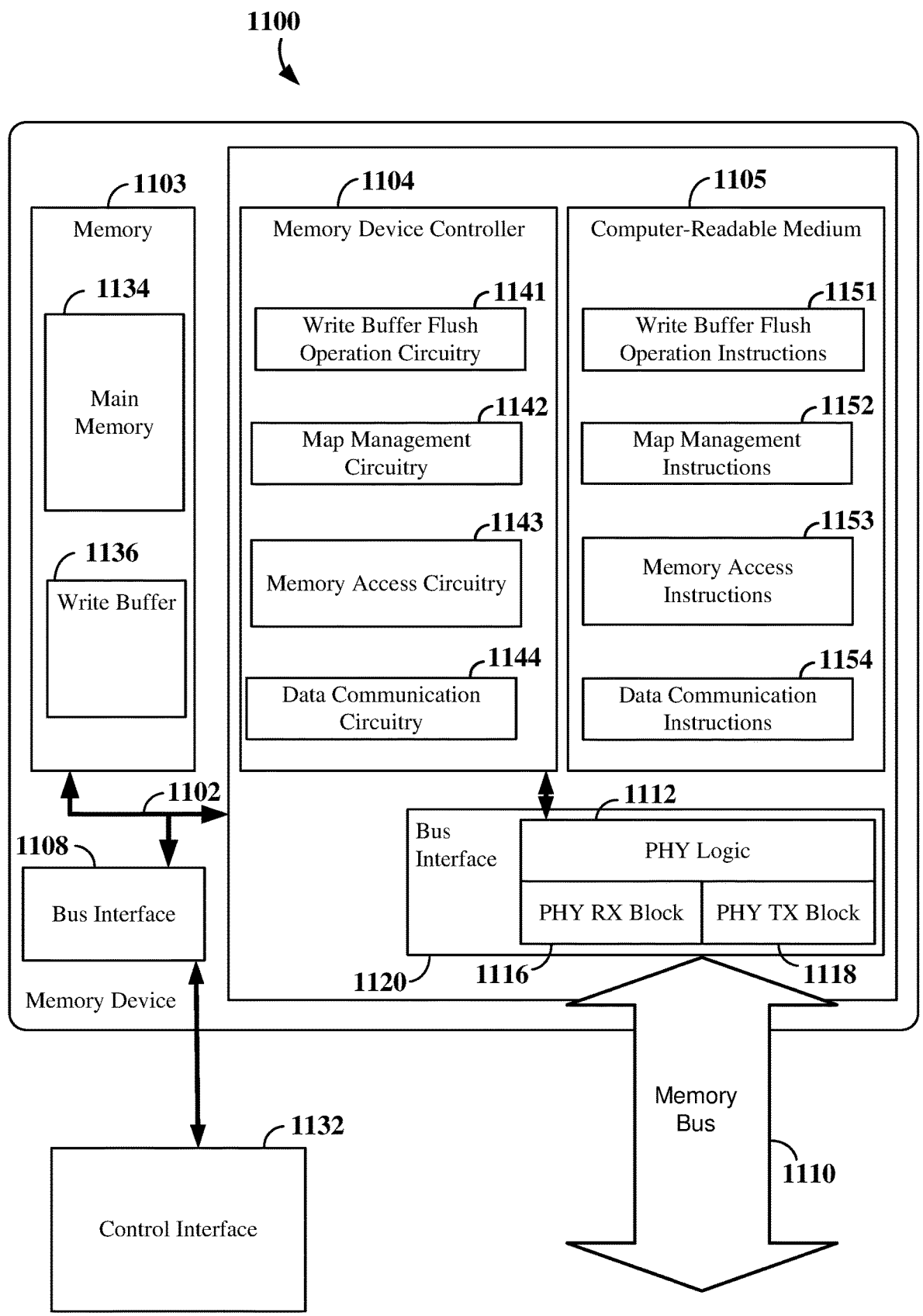
FIG. 11 is a block diagram of a memory device according to aspects of the present disclosure.

FIG. 11 is a block diagram of an example of a hardware implementation for a memory device 1100 e.g., a memory card, a flash stick, a solid state drive, an embedded memory, a random-access memory, or any other suitable components with a memory bus 1110 having a write buffer and write buffer flush operations. In this example, the memory device has a memory device controller 1104 for performing the primary operations of the memory device, a computer-readable medium 1105 to provide instructions for the memory device controller 1104, and a memory 1103 to contain a main memory 1134 and a write buffer 1136 among other components. The memory device 1100 has a bus interface 1120 to support a memory bus 1110 to a host. The bus interface has a PHY receive block 1116 and a PHY transmit block 1118 coupled to the memory bus and PHY logic 1112. The memory device controller 1104 performs the operations described above to service the memory bus 1110 between memory device 1100 and a host (not shown). The memory device contains other components (not shown) configured to perform other functions of the memory device as is suitable for the type of memory bus.

In this example, the memory device 1100 may be implemented with a bus architecture, represented generally by the bus 1102. The bus 1102 may include any number of interconnecting buses and bridges depending on the specific application of the memory device 1100 and the overall design constraints. The bus 1102 communicatively couples together various circuits including memory 1103, the memory device controller 1104, the computer-readable media (represented generally by the computer-readable medium 1105) having instructions stored thereon. The bus 1102 may also link various other circuits such as timing sources, peripherals, data buffers, modules, power management circuits, and other processing cores, which are not described any further. A bus interface 1108 provides an interface between the bus 1102 and a control interface 1132 or other interfaces. In some examples, the control interface may be through the memory bus 1110. The memory device controller 1104 may communicate operations, administration, or management control with the control interface 1132 through the bus 1102.

The PHY transmit block 1116 and the PHY receive block 1118 are coupled to the memory bus 1110 that corresponds to the upstream link and the downstream link described above that couple a host to the memory device 1100 through pins on respective connectors for the memory bus 1110. The module also includes PHY logic 1112 which may include the link logic to control the data applied to each line and the state under the control of the memory device controller 1104. The PHY logic 1112 may also include clock generators coupled to clock sources to generate clock signals and other reference signals for the upstream and downstream links.

The memory device controller 1104 is responsible for managing the PHY logic 1112 and for interface processing, including the execution of software stored on the computer-readable medium 1105. The software, when executed by the memory device controller 1104, causes the memory device 1100 to perform the various functions described below for any particular apparatus. The computer-readable medium 1105 and the memory 1103 may also be used for storing data that is manipulated by the memory device controller 1104 when executing software.

The memory device controller 1104 may include write buffer flush operation circuitry 1141 to initiate a write buffer flush operation by the memory device and to suspend a write buffer flash operation in response to receiving a write command from the host. The write buffer flush operation circuitry 1141 may also be configured to send responses and receive requests with a host to send a write buffer flush needed request, including a level of urgency and to receive write buffer flush enable flags. The write buffer flush operation circuitry 1141 may include one or more hardware components that provide the physical structure that performs various processes related to initiating and suspending a write buffer flush operation and sending a last flushed address. The write buffer flush operation circuitry 1141 may include functionality for a means for initiating a write buffer flush operation, a means for suspending a write buffer flush operation and a means for sending a last flushed address to the host. The write buffer flush operation circuitry 1141 may further be configured to execute write buffer flush operation instructions 1151 included on the computer-readable medium 1105 to implement the write buffer flush operation support described herein.

The memory device controller 1104 may include map management circuitry 1142 configured to unmap a portion of the write buffer and to buffer write commands using the write buffer. as discussed herein. The map management circuitry 1142 may include functionality for managing the write buffer map and unmapping blocks of the write buffer. The map management circuitry 1142 may include functionality for a means for unmapping blocks of the write buffer and for buffering write commands using a portion of the write buffer. The map management circuitry 1142 may further be configured to execute map management instructions 1152 included on the computer-readable medium 1105 to implement one or more functions described herein.

The memory device controller 1104 may include memory access circuitry 1143 configured to receive write commands and to write to the write buffer and the main memory. The memory access circuitry 1143 may include functionality for a means to receive memory write commands and to write to the write buffer and the main memory. The memory access circuitry 1143 may further be configured to execute memory access instructions 1153 included on the computer-readable medium 1105 to implement one or more functions described herein.

The memory device controller 1104 may include data communication circuitry 1144 configured to communicate commands and data with the host through the memory bus 1110, as discussed herein. The data communication circuitry 1144 may include functionality for a means for communicating data with the host. The data communication circuitry 1144 may further set parameters for communicating through the memory bus. The data communication circuitry 1144 may further be configured to execute data communication instructions 1154 included on the computer-readable medium 1105 to implement one or more functions described herein.

Figure 12:
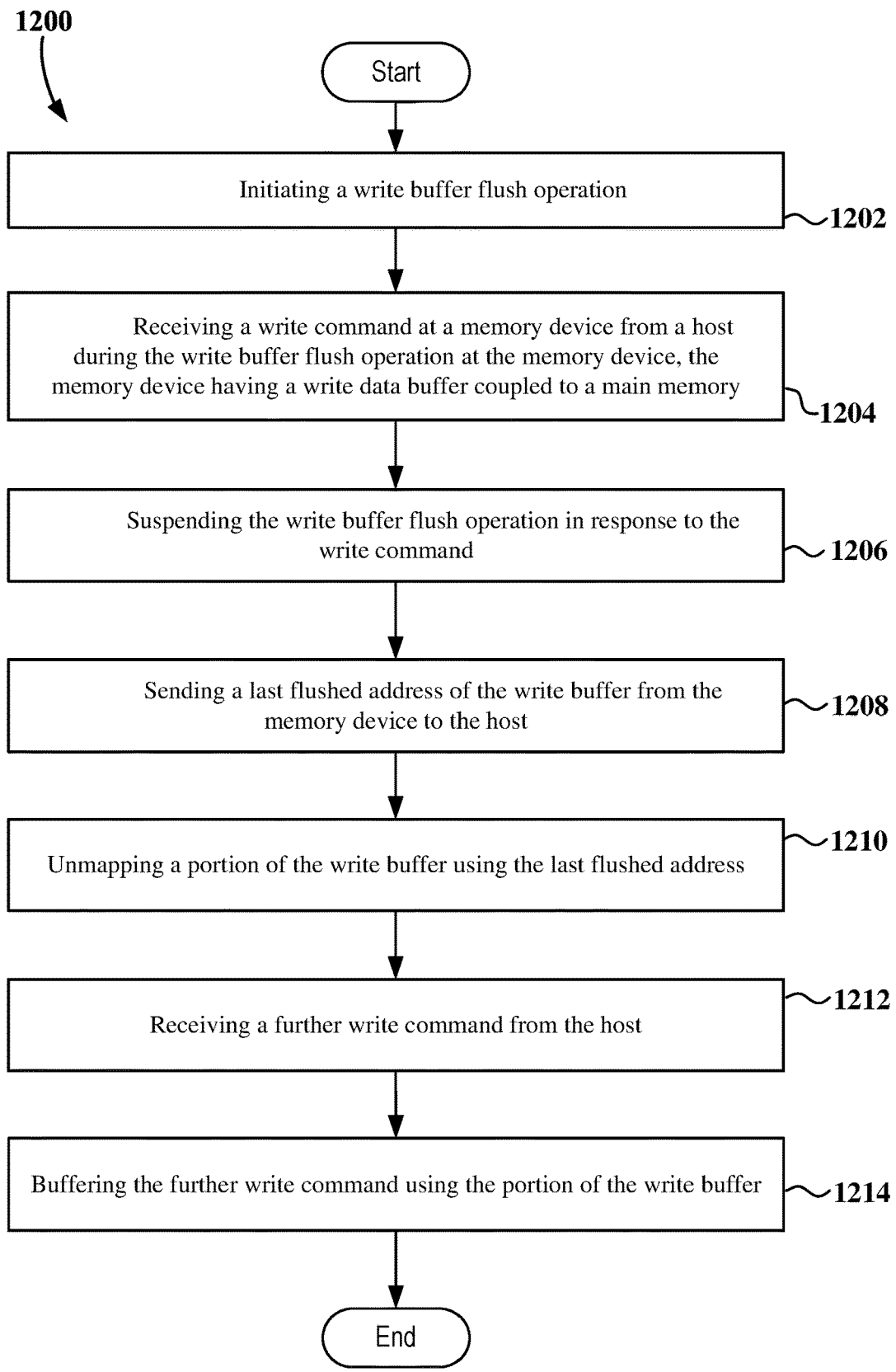
FIG. 12 is a flow diagram of aspects of suspending a write buffer flush due to a host command according to aspects of the present disclosure.

FIG. 12 is a process flow diagram illustrating an example of a method for unmapping a portion of a write buffer for access during a write to the main memory. The method may be performed in the memory device controller 1104 of FIG. 11 or other circuitry, and software as described in the context of FIG. 11. The method 1200 begins at block 1202 with initiating a write buffer flush operation. The operation may be initiated on command or autonomously or in another way. At block 1204, receiving a write command at a memory device from a host during the write buffer flush operation at the memory device is performed. The memory device has a write buffer coupled to a main memory. At block 1206, suspending the write buffer flush operation in response to the write command is performed.

At block 1208, the memory device is sending a last flushed address of the write buffer from the memory device to the host. The method 1200 continues in block 1210 with unmapping a portion of the write buffer using the last flushed address. After the unmapping at block 1212, receiving a further write command from the host is performed and at block 1214 buffering the further write command using the portion of the write buffer is performed.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Combinations of the above should also be included within the scope of computer-readable media.

The following provides an overview of examples of the present disclosure.

Example 1: A memory device comprising: a main memory; a write buffer coupled to the main memory and to a bus interface; and a memory controller configured to initiate a write buffer flush operation; the bus interface coupled to the main memory and to the write buffer to receive a write command from a host during the write buffer flush operation, and the memory controller configured to initiate the write buffer flush operation, to suspend the write buffer flush operation in response to the write command, to send a last flushed address of the write buffer from the memory device to the host through the bus interface, and to unmap a portion of the write buffer using the last flushed address.

Example 2: The memory device of example 1, wherein the suspending the write buffer flush operation comprises suspending the write buffer flush operation before the write buffer flush operation is complete.

Example 3: The memory device of example 1 or 2, the memory controller purging a block of memory cells of the write buffer before suspending the write buffer flush operation.

Example 4: The memory device of any one or more of examples 1 to 3, wherein the write buffer flush operation comprises writing data from memory cells of the write buffer to the main memory.

Example 5: The memory device of any one or more of examples 1 to 4, wherein the portion of the write buffer comprises a plurality of memory cells, and wherein the unmapping the portion comprises modifying an address map at the memory device to deallocate the portion of the write buffer.

Example 6: The memory device of any one or more of examples 1 to 5, the memory controller configured to: send a write buffer flush needed notification to the host; and receive a write buffer flush enable request from the host before initiating the write buffer flush operation.

Example 7: The memory device of any one or more of examples 1 to 6, the memory controller configured to complete pending write commands to the write buffer before initiating the write buffer flush operation.

Example 8: The memory device of any one or more of examples 1 to 7, the memory controller configured to resume the write buffer flush operation after completing pending commands to the write buffer.

Example 9: The memory device of example 8, wherein the resuming write buffer flush operation comprises resuming the write buffer flush operation starting with a lowest physical address memory cell of the write buffer and proceeding sequentially through physical addresses of the write buffer.

Example 10: The memory device of example 9, wherein the portion of the write buffer comprises memory cells from the lowest physical address memory cell of the write buffer to the last flushed address.

Example 11: The memory device of any one or more of examples 1 to 10, the bus interface configured to send a response to the host indicating that a write buffer flush operation is suspended in response to receiving the write command.

Example 12: The apparatus of example 11, wherein the response comprises a Universal Flash Storage wExceptionEventControl bit.

Example 13: The memory device of any one or more of examples 1 to 12, the bus interface configured to receive an unmap command from the host and wherein the unmapping is in response to the unmap command.

Example 14: The memory device of any one or more of examples 1 to 13, wherein the bus interface is configured to receive a further write command from the host; and the memory controller is configured to buffer the further write command using the portion of the write buffer.

Example 15: A method comprising: initiating a write buffer flush operation; receiving a write command at a memory device from a host during the write buffer flush operation at the memory device, the memory device having a write buffer coupled to a main memory; suspending the write buffer flush operation in response to the write command; sending a last flushed address of the write buffer from the memory device to the host; unmapping a portion of the write buffer using the last flushed address; receiving a further write command from the host; and buffering the further write command using the portion of the write buffer.

Example 16: The method of example 15, further comprising resuming the write buffer flush operation after completing pending commands to the write buffer.

Example 17: The method of example 15 or 16, wherein the resuming write buffer flush operation comprises resuming the write buffer flush operation starting with a lowest physical address memory cell and proceeding sequentially through physical addresses of the write buffer.

Example 18: The method of any one or more of examples 15 to 17, further comprising sending a response to the host indicating that a write buffer flush operation is suspended in response to receiving the write command.

Example 19: A host comprising: a command queue configured to store commands to be sent to a memory device, the memory device having a write buffer coupled to a main memory; a write buffer map; a bus interface coupled to the memory device, configured to send a write command to the memory device from the host during a write buffer flush operation at the memory device and to receive a last flushed address of the write buffer from the memory device; and a host controller configured to determine a flushed portion of the write buffer based on the last flushed address; the bus interface configured to send an unmap command to the memory device, to unmap the portion of the write buffer and to send a further write command.

Example 20: The host of example 19, the bus interface configured to receive a write buffer flush needed request from the memory device before the sending the write command; and the host controller configured to check a command queue and to alternately send or not send a write buffer flush enable flag to the memory device.

Example 21: A method comprising: sending a write command to a memory device from a host during a write buffer flush operation at the memory device, the memory device having a write buffer coupled to a main memory; receiving a last flushed address of the write buffer from the memory device; determining a flushed portion of the write buffer based on the last flushed address; sending an unmap command to the memory device, to unmap the portion of the write buffer; and sending a further write command.

Example 22: The method of example 21, comprising: receiving a write buffer flush needed request from the memory device before the sending the write command; and sending a write buffer flush enable flag in response to the write buffer flush needed request.

Example 23: The method of example 21 or 22, comprising checking a command queue and if additional write commands are in the command queue, then not sending the write buffer flush enable flag.

Example 24: The method of any one or more of examples 21 to 23, comprising receiving a response from the memory device indicating that a write buffer flush operation is suspended in response to the sending the write command.

What is claimed is:

1. A memory device comprising:
   a main memory;
   a write buffer coupled to the main memory and to a bus interface; and
   a memory controller configured to initiate a write buffer flush operation,
   wherein the bus interface is coupled to the main memory and to the write buffer to receive a write command from a host during the write buffer flush operation, to send a last flushed address to the host, and to receive an unmap command from the host based on the last flushed address, and
   wherein the memory controller is further configured, to suspend the write buffer flush operation in response to the write command, to send the last flushed address of the write buffer from the memory device to the host through the bus interface in response to suspension of the write buffer flush operation, wherein the last flushed address indicates a portion of the write buffer that has been flushed in the write buffer flush operation before the suspension of the write buffer operation, to process the write command after the suspension of the write buffer operation, and to unmap the portion of the write buffer in response to the unmap command using the last flushed address.

2. The memory device of claim 1, wherein the suspending the write buffer flush operation comprises suspending the write buffer flush operation before the write buffer flush operation is complete.

3. The memory device of claim 1, wherein the memory controller is configured to purge a block of memory cells of the write buffer before suspending the write buffer flush operation.

4. The memory device of claim 1, wherein the write buffer flush operation comprises writing data from memory cells of the write buffer to the main memory.

5. The memory device of claim 1, wherein the portion of the write buffer comprises a plurality of memory cells, and wherein the unmapping the portion comprises modifying an address map at the memory device to deallocate the portion of the write buffer.

6. The apparatus of claim 1, wherein the memory controller is configured to:
   send a write buffer flush needed notification to the host; and
   receive a write buffer flush enable request from the host before initiating the write buffer flush operation.

7. The memory device of claim 1, wherein the memory controller is configured to complete pending write commands to the write buffer before initiating the write buffer flush operation.

8. The memory device of claim 1, wherein the memory controller is configured to resume the write buffer flush operation after completing pending commands to the write buffer.

9. The memory device of claim 8, wherein the resuming the write buffer flush operation comprises resuming the write buffer flush operation starting with a lowest physical address memory cell of the write buffer and proceeding sequentially through physical addresses of the write buffer to the last flushed address.

10. The memory device of claim 9, wherein the portion of the write buffer comprises memory cells from the lowest physical address memory cell of the write buffer to the last flushed address.

11. The memory device of claim 1, wherein the bus interface is configured to send a response to the host, wherein the response is configured to indicate that a write buffer flush operation is suspended in response to receiving the write command.

12. The memory device of claim 11, wherein the response comprises a Universal Flash Storage wExceptionEventControl bit.

13. The memory device of claim 1, wherein the unmap command is to unmap a flushed portion of the write buffer determined based on the last flushed address.

14. The memory device of claim 1, wherein
   the bus interface is configured to receive a further write command from the host; and
   the memory controller is configured to buffer the further write command using the portion of the write buffer.

15. A method comprising:
   initiating a write buffer flush operation;
   receiving a write command at a memory device from a host during the write buffer flush operation at the memory device, the memory device having a write buffer coupled to a main memory;
   suspending the write buffer flush operation in response to the write command;
   sending a last flushed address of the write buffer from the memory device to the host in response to suspension of the write buffer flush operation, wherein the last flushed address indicates a portion of the write buffer that has been flushed in the write buffer flush operation before the suspension of the write buffer operation;
   processing the write command after the suspension of the write buffer operation;
   receiving an unmap command from the host in response to the write command and in response to sending the last flushed address;
   unmapping the portion of the write buffer in response to the unmap command using the last flushed address;
   receiving a further write command from the host; and
   buffering the further write command using the portion of the write buffer.

16. The method of claim 15, further comprising resuming the write buffer flush operation after completing pending commands to the write buffer.

17. The method of claim 16, wherein the resuming write buffer flush operation comprises resuming the write buffer flush operation starting with a lowest physical address memory cell and proceeding sequentially through physical addresses of the write buffer to the last flushed address.

18. The method of claim 15, further comprising sending a response to the host indicating that a write buffer flush operation is suspended in response to receiving the write command.

19. A host comprising:
a command queue configured to store commands to be sent to a memory device, wherein the memory device has a write buffer coupled to a main memory;
a write buffer map;
a bus interface coupled to the memory device, wherein the bus interface is configured to send a write command to the memory device from the host during a write buffer flush operation at the memory device and to receive a response that the write buffer flush operation has been suspended and a last flushed address of the write buffer from the memory device, wherein the last flushed address indicates a portion of the write buffer that has been flushed in the write buffer flush operation before the suspension of the write buffer operation; and
a host controller configured to determine the flushed portion of the write buffer based on the last flushed address;
wherein the bus interface is configured to send an unmap command to the memory device, to unmap the flushed portion of the write buffer as determined by the host based on the last flushed address and to send a further write command.

20. The host of claim 19, wherein
the bus interface is configured to receive a write buffer flush needed request from the memory device before the sending the write command; and
the host controller is configured to check a command queue and to alternately send or not send a write buffer flush enable flag to the memory device.

21. A method comprising:
sending a write command to a memory device from a host during a write buffer flush operation at the memory device, the memory device having a write buffer coupled to a main memory;
receiving a response that the write buffer flush operation has been suspended and a last flushed address of the write buffer from the memory device, wherein the last flushed address indicates a portion of the write buffer that has been flushed in the write buffer flush operation before the suspension of the write buffer operation;
determining the flushed portion of the write buffer based on the last flushed address;
sending an unmap command to the memory device, to unmap the flushed portion of the write buffer as determined by the host based on the last flushed address; and
sending a further write command.

22. The method of claim 21, comprising:
receiving a write buffer flush needed request from the memory device before the sending the write command; and
sending a write buffer flush enable flag in response to the write buffer flush needed request.

23. The method of claim 21, comprising checking a command queue and if additional write commands are in the command queue, then not sending the write buffer flush enable flag.

24. The method of claim 21, comprising receiving a response from the memory device indicating that a write buffer flush operation is suspended in response to the sending the write command.

* * * * *